United States Patent
Kawano et al.

Patent Number: 5,193,766
Date of Patent: Mar. 16, 1993

[54] RETRY/RECOVERY METHOD IN RENDEZVOUS MANEUVER

[75] Inventors: Isao Kawano, Tsuchiura; Yasufumi Wakabayashi, Tsukuba; Hiroyuki Nakamura, Shirako; Takahiro Suzuki, Tsukuba; all of Japan

[73] Assignee: National Space Development Agency of Japan, Tokyo, Japan

[21] Appl. No.: 731,242

[22] Filed: Jul. 17, 1991

[30] Foreign Application Priority Data

Jul. 18, 1990 [JP] Japan ................ 2-188062

[51] Int. Cl.⁵ .................................. B64G 1/24
[52] U.S. Cl. .................... 244/161; 244/164
[58] Field of Search ............ 244/158 R, 164, 161

[56] References Cited
U.S. PATENT DOCUMENTS

4,898,349 2/1990 Miller ..................... 244/161

OTHER PUBLICATIONS

Kaplan, *Modern Spacecraft Dynamics and Control*, John Wiley & Sons (pbl), 1976, pp. 108–115.

*Primary Examiner*—Galen Barefoot
*Attorney, Agent, or Firm*—Armstrong, Westerman, Hattori, McLeland & Naughton

[57] ABSTRACT

In a rendezvous maneuver for approaching a rendezvous spacecraft to a target spacecraft through a reference trajectory for approach which is different in altitude and period from a trajectory of the target spacecraft, when the rendezvous spacecraft is deviated from the reference trajectory for approach as a result from a failure in the maneuver, it is first maneuvered in the direction of altitude after 0.2 revolutions of the rendezvous spacecraft, and then maneuvered in the direction of phase after another 0.2 revolutions. The rendezvous spacecraft is thereby restored to the reference trajectory with no fear of entering a collision course, so that high reliable retry/recovery may be performed promptly and safely.

2 Claims, 3 Drawing Sheets

RETRY/RECOVERY METHOD IN RENDEZVOUS MANEUVER

BACKGROUND OF THE INVENTION

This invention generally relates to a rendezvous maneuver for approaching a rendezvous spacecraft to a target spacecraft, and more particularly to a retry/recovery method in such a rendezvous maneuver for restoring the rendezvous spacecraft to a reference trajectory for approach to the target spacecraft in case of abnormality.

To achieve a rendezvous necessary for docking of spacecrafts or the like, trajectory control (called a rendezvous maneuver) of a rendezvous spacecraft (called a chaser) is required. Generally, a rendezvous approach of a rendezvous spacecraft to a target spacecraft (called a target) is performed by utilizing a difference in period between the two spacecrafts due to a difference in altitude between their orbits. For example, the rendezvous spacecraft approaches the target spacecraft through a trajectory which has a lower altitude and a shorter period (a greater angular velocity) than that of the target spacecraft. This preset approach trajectory is called a reference trajectory.

FIGS. 1A to 1C are views showing typical examples of the reference trajectory for approach in the rendezvous maneuver. Each of these drawings depicts an approach pattern of the rendezvous spacecraft to the target spacecraft in a target-centered, rotating coordinate-system where the origin represents the target spacecraft, the X-axis represents a distance in the direction of phase, and the Y-axis represents a distance in the direction of altitude. In the rendezvous maneuver, the rendezvous spacecraft is accelerated or decelerated at the apsis (apogee or perigee) in the direction of phase (the direction of X-axis) so that the apsis altitude of the rendezvous spacecraft gradually approaches the altitude of the target spacecraft. For example, acceleration at the apogee increases the altitude of the perigee, whereas acceleration at the perigee increases the altitude of the apogee.

FIG. 1A depicts the reference trajectory in the case where the apogee of a rendezvous spacecraft $S_R$ is set to the altitude $H_T$ of a target spacecraft $S_T$ and the perigee altitude of the rendezvous spacecraft is gradually increased in the order of $a_1, a_2, a_3, \ldots$ as shown. This technique is called an A technique. FIG. 1B depicts the reference trajectory in the case where the apogee and perigee altitudes of the rendezvous spacecraft $S_R$ are alternately approached to the altitude $H_T$ of a target spacecraft $S_T$. In other words, FIG. 1B depicts the reference trajectory in the case where a circular orbit of the rendezvous spacecraft $S_R$ lower than the altitude $H_T$ of the target spacecraft $S_T$ is approached to that of the target spacecraft $S_T$. This technique is called a B technique. In these cases, the rendezvous spacecraft $S_R$ is finally approached to the target spacecraft $S_T$ using a navigation sensor such as a radar. FIG. 1C depicts the reference trajectory based on a so-called C technique where the A and B techniques are combined. In this case, the rendezvous spacecraft is accelerated in the direction of speed at points $P_1$ to $P_5$, TI and TF. Note that TF represents a final point of the trajectory of the rendezvous spacecraft.

While the rendezvous of spacecrafts are intended for in-orbit service such as resupply and/or withdrawal of materials, the launching cost of rendezvous spacecrafts is very expensive. When approaching the rendezvous spacecraft to the target spacecraft, therefore, if the rendezvous spacecraft cannot be injected into the reference trajectory for approach by reasons such as any trouble in a thruster or a large maneuver error, it is required to promptly perform a retry/recovery for the improved rate of mission achievement.

However, the retry/recovery of the rendezvous maneuver accompanies the following problems:

(1) If the retry is started after the rendezvous spacecraft has approached the target spacecraft closer than scheduled, there is a risk that the rendezvous spacecraft may enter a collision course with respect to the target spacecraft.

(2) If the retry is not performed promptly, the rendezvous spacecraft may pass over and go ahead of the target spacecraft, making the recovery to the reference trajectory extremely difficult.

(3) Once any abnormality happens, it is hard to make a judgment on whether or not guidance and control will be normally performed after that.

To date, the retry/recovery has been required to be designed in a very complex manner, taking into account the above problems.

SUMMARY OF THE INVENTION

The present invention has been made to solve the above problems in a conventional retry/recovery method for use with a rendezvous maneuver, and has for its object to provide a retry/recovery method in a rendezvous maneuver which can reliably restore a rendezvous spacecraft to a reference trajectory by simple trajectory control.

To achieve the above object, in a rendezvous maneuver for approaching a rendezvous spacecraft to a target spacecraft through a reference trajectory for approach which is different in altitude and period from a trajectory of the target spacecraft, the present invention is featured in that when the rendezvous spacecraft is deviated from the reference trajectory for approach as a result of a failure in maneuvering, the rendezvous spacecraft is restored to the reference trajectory for approach by maneuvering the rendezvous spacecraft in the velocity of the direction of altitude after 0.2 revolutions of the rendezvous spacecraft, and then maneuvering the rendezvous spacecraft in the velocity of the direction of phase after another 0.2 revolutions.

By additionally maneuvering the rendezvous spacecraft two times in such a manner as to control its altitude rate after 0.2 around and then control its phase rate after another 0.2 around, as stated above, the rendezvous spacecraft is always restored to the reference trajectory with no fear of entering a collision course, so that retry/recovery operation may be performed promptly and safely. Also, since control points in time (after 0.2 around and 0.4 around) and control amounts of the retry/recovery maneuver can be simply set, it is possible for a spacecraft having a guidance and control system with perfect redundancy to easily realize an automatic restoration.

DETAILED DESCRIPTION OF EMBODIMENTS

Figure 1A:
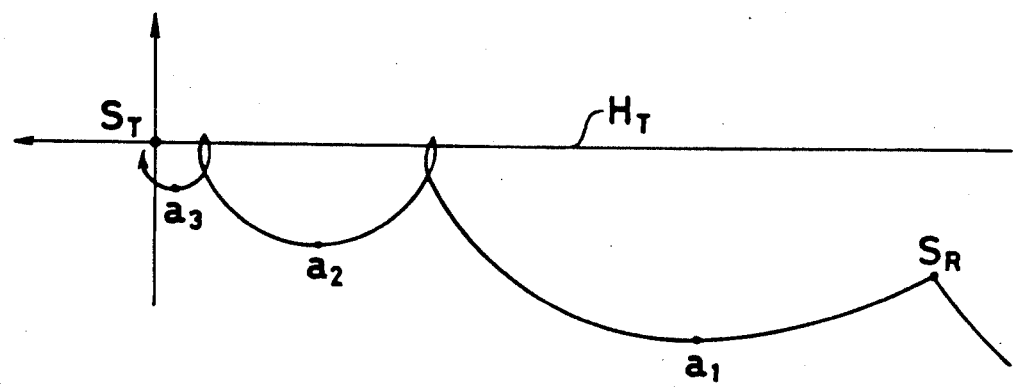
FIGS. 1A to 1C are views showing typical examples of a reference trajectory for approach in a rendezvous maneuver.
Figure 1B:
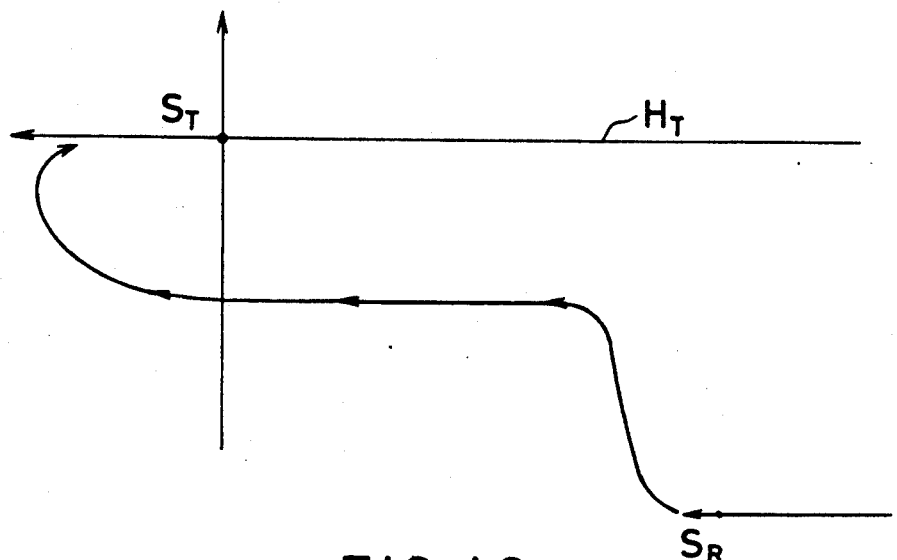
Figure 1C:
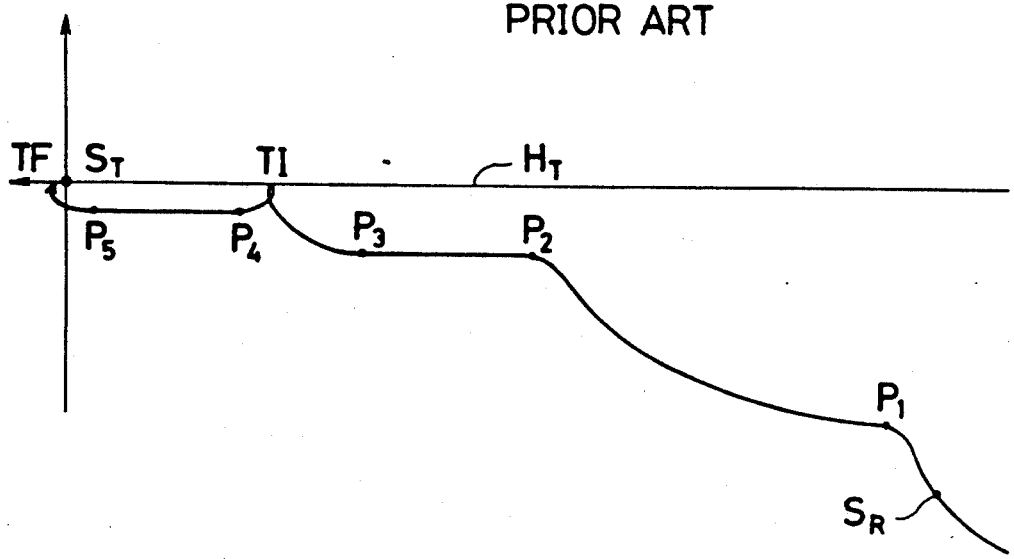

Prior to detailed description of preferred embodiments, the principles of the present invention will be first explained.

After the distance between a target spacecraft and a rendezvous spacecraft (chaser) is so sufficiently shortened that the relative approach distance for rendezvous falls within a range of about 100 km, the following Hill's equation hold in the aforesaid target-fixed coordinate system:

$$\begin{cases} \ddot{x} - 2\omega \dot{y} &= a_x \\ \ddot{y} + 2\omega \dot{x} - 3\omega^2 y &= a_y \\ \ddot{z} + \omega^2 z &= a_z \end{cases}$$

where $2\omega \dot{y}$, $2\omega \dot{x}$: Coriolis' accelerations $3\omega^2 y$, $\omega^2 z$: centrifugal accelerations $a_x$, $a_y$, $a_z$: accelerations in respective directions In the case of a coasting flight ($a_x = a_y = a_z = 0$), C-W (Clohessy-Wiltshire) solutions are given by equations (1-1) to (1-4):

$$\begin{cases} x(t) = x_0 + 6(\omega t - \sin\omega t)y_0 + \\ \qquad 1/\omega \cdot (4\sin\omega t - 3\omega t)\dot{x}_0 + \\ \qquad 2/\omega \cdot (1 - \cos\omega t)\dot{y}_0 \\ y(t) = (4 - 3\cos\omega t)y_0 + \\ \qquad 2/\omega \cdot (\cos\omega t - 1)\dot{x}_0 + \\ \qquad 1/\omega \cdot \sin\omega t \cdot \dot{y}_0 \\ \dot{x}(t) = 6\omega(1 - \cos\omega t)y_0 + \\ \qquad (4\cos\omega t - 3)\dot{x}_0 + 2\sin\omega t \cdot \dot{y}_0 \\ \dot{y}(t) = 3\omega\sin\omega t \cdot y_0 - 2\sin\omega t \cdot \dot{x}_0 + \\ \qquad \cos\omega t \cdot \dot{y}_0 \end{cases} \quad \begin{matrix}(1-1)\\ \\ \\ (1-2)\\ \\ \\ (1-3)\\ \\ (1-4)\end{matrix}$$

where
- x(t): a value of x after t seconds from the reference time
- y(t): a value of y after t seconds from the reference time
- $\dot{x}$(t): an x-direction velocity after t seconds from the reference time
- $\dot{y}$(t): a y-direction velocity after t seconds from the reference time
- $x_0$: a value of x at the reference time
- $y_0$: a value of y at the reference time
- $\dot{x}_0$: an x-direction velocity at the reference time
- $\dot{y}_0$: a y-direction velocity at the reference time
- $\omega$: an angular rate of the target's orbit From the above equation (1-1), there holds the following equation (2) at $\omega t = 0.203 \times 2\pi$ (after about 0.2 around):

$$\frac{\partial x}{\partial \dot{x}_0} = \frac{1}{\omega}(4\sin\omega t - 3\omega t) = 0 \quad (2)$$

Accordingly, regardless of the magnitude of the initial approach velocity $\dot{x}_0$ of the rendezvous spacecraft, the x-direction distance from the rendezvous spacecraft to the target spacecraft after 0.2 around becomes constant. Stated otherwise, even in case of the approach maneuver failing, the rendezvous spacecraft is positioned after 0.2 around just below or above the imaginary rendezvous spacecraft which would normally travel along the preset reference trajectory.

Here, the above equations (1-1) to (1-4) are rewritten as follows:

$$\begin{pmatrix} x(t) \\ y(t) \\ \dot{x}(t) \\ \dot{y}(t) \end{pmatrix} = \Phi(t) \begin{pmatrix} x_0 \\ y_0 \\ \dot{x}_0 \\ \dot{y}_0 \end{pmatrix} \quad (3\text{-}1)$$

$$\Phi(t) = \begin{pmatrix} 1 & 6(\theta - S_\theta) & \frac{1}{\omega}(4S_\theta - 3\theta) & \frac{2}{\omega}(1 - C_\theta) \\ 0 & (4 - 3C_\theta) & \frac{2}{\omega}(C_\theta - 1) & \frac{1}{\omega}S_\theta \\ 0 & 6\omega(1 - C_\theta) & (4C_\theta - 3) & 2S_\theta \\ 0 & 3\omega S_\theta & -S_\theta & C_\theta \end{pmatrix} \quad (3\text{-}2)$$

where $\theta = \omega t$ $S\theta = \sin \omega t$ $C\theta = \cos \omega t$

In the case of $\omega t = 0.203 \times 2\pi$ (given time point $t \equiv t_{0.2}$), the equation (3-2) turns to the following equation (3-3) because of $4S\theta - 3\theta = 0$.

$$\Phi(t_{0.2}) = \begin{pmatrix} 1 & 6(\theta - S_\theta) & 0 & \frac{2}{\omega}(1 - C_\theta) \\ 0 & (4 - 3C_\theta) & \frac{2}{\omega}(C_\theta - 1) & \frac{1}{\omega}S_\theta \\ 0 & 6\omega(1 - C_\theta) & (4C_\theta - 3) & 2S_\theta \\ 0 & 3\omega S_\theta & -2S_\theta & C_\theta \end{pmatrix} \quad (3\text{-}3)$$

Figure 2:
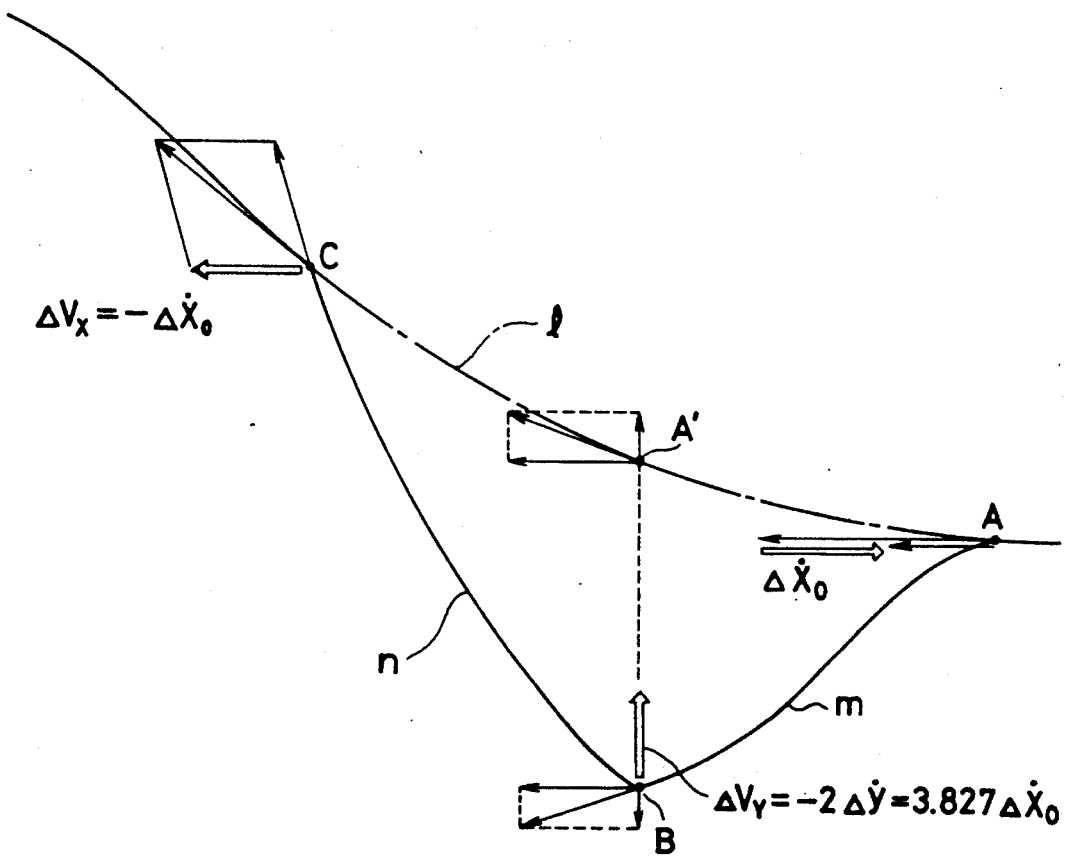
FIG. 2 is an explanatory view for explaining the principles of a retry/recovery method in the rendezvous maneuver according to the present invention.

Assuming now that, as shown in FIG. 2, a failure of the approach maneuver at a point A causes an approach velocity error of $\Delta \dot{x}_0$, and the travel trajectory of the rendezvous spacecraft is displaced to a trajectory m after the maneuver failure. At this time, the error at a point B after 0.2 around is expressed by an equation (4) below:

$$\begin{pmatrix} \Delta x \\ \Delta y \\ \Delta \dot{x} \\ \Delta \dot{y} \end{pmatrix}_{t0.2} = \Phi(t_{0.2}) \begin{pmatrix} 0 \\ 0 \\ \Delta \dot{x}_0 \\ 0 \end{pmatrix} \tag{4}$$

$$= \begin{pmatrix} 0 \\ \frac{2}{\omega}(C_\theta - 1) \\ (4C_\theta - 3) \\ -2S_\theta \end{pmatrix} \Delta \dot{x}_0$$

From the above equation (4), it will be found that the x-direction distance is not affected even with the displacement from a reference trajectory 1 due to the maneuver failure. In other words, after 0.2 around, the point B is located just above or below (below in the illustrated example) a position A' on the reference trajectory 1.

At the point B after 0.2 around, $\Delta V_Y$ expressed by the following equation (5) is first applied, as a recovery maneuve, to the rendezvous spacecraft in the direction of altitude:

$$\Delta V_Y = -2\Delta \dot{y}_{0.2} = 4S_\theta \Delta \dot{x}_0$$

$$(=3.827\Delta \dot{x}_0) \tag{5}$$

By adding $\Delta V_Y$ shown in the above equation (5), $\Delta \dot{y}$ in the equation (4) is changed as expressed by an equation (6) below:

$$\Delta \dot{y}_+ = +2S_\theta \Delta \dot{x}_0 \tag{6}$$

Then, a recovery trajectory resulting from that recovery maneuver is indicated by n in FIG. 2.

Further, the error at a point C after another 0.2 around, i.e., after total 0.4 around from the point A of the maneuver failure is expressed by an equation (7) below:

$$\begin{pmatrix} \Delta x \\ \Delta y \\ \Delta \dot{x} \\ \Delta \dot{y} \end{pmatrix}_{t0.4} = \Phi(t_{0.2}) \begin{pmatrix} \Delta x \\ \Delta y \\ \Delta \dot{x} \\ \Delta \dot{y} \end{pmatrix}_{t0.2} \tag{7}$$

$$= \begin{pmatrix} 1 & 6(\theta - S_\theta) & 0 & \frac{2}{\omega}(1 - C_\theta) \\ 0 & (4 - 3C_\theta) & \frac{2}{\omega}(C_\theta - 1) & \frac{1}{\omega}S_\theta \\ 0 & 6\omega(1 - C_\theta) & (4C_\theta - 3) & 2S_\theta \\ 0 & 3\omega S_\theta & -2S_\theta & C_\theta \end{pmatrix}$$

$$\cdot \begin{pmatrix} 0 \\ \frac{2}{\omega}(C_\theta - 1) \\ (4C_\theta - 3) \\ +2S_\theta \end{pmatrix} \cdot \Delta \dot{x}_0$$

In the above equation (7), the first to fourth terms are given as follows:

1st term $= \frac{12}{\omega}(\theta - S_\theta)(C_\theta - 1) - \frac{4}{\omega}(C_\theta - 1)S_\theta$ $= \frac{4}{\omega}(3\theta - 4S_\theta)(C_\theta - 1) = 0$ $[\because (3\theta - 4S_\theta) = 0]$ 2nd term $= \frac{2}{\omega}(4 - 3C_\theta)(C_\theta - 1) +$ $\frac{2}{\omega}(C_\theta - 1)(4C_\theta - 3) + \frac{2}{\omega}S_\theta^2$ $= \frac{2}{\omega}\{(C_\theta + 1)(C_\theta - 1) + S_\theta^2\}$ $= \frac{2}{\omega}(C_\theta^2 - 1 + S_\theta^2) = 0$ 3rd term $= -12(C_\theta - 1)^2 + (4C_\theta - 3)^2 + 4S_\theta^2$ $= (-12C_\theta^2 + 24C_\theta - 12 +$ $16C_\theta^2 - 24C_\theta + 9 + 4S_\theta^2)$ $= 4(C_\theta^2 + S_\theta^2) - 3 = 1$ 4th term $= 6S_\theta(C_\theta - 1) - 2S_\theta(4C_\theta - 3) + 2S_\theta C_\theta$ $= (6 - 8 + 2)S_\theta C_\theta + (-6 + 6)S_\theta = 0$ Therefore, the following equation (8) is obtained:

$$\begin{pmatrix} \Delta x \\ \Delta y \\ \Delta \dot{x} \\ \Delta \dot{y} \end{pmatrix} = \begin{pmatrix} 0 \\ 0 \\ 1 \\ 0 \end{pmatrix} \Delta \dot{x}_0 = \begin{pmatrix} 0 \\ 0 \\ \Delta \dot{x}_0 \\ 0 \end{pmatrix} \tag{8}$$

Thus, the point C after 0.4 around is located on the reference trajectory 1, and the rendezvous spacecraft can be restored from the retry trajectory n to the reference trajectory 1 by adding a velocity $\Delta V_X = -\Delta \dot{x}_0$ in the same amount as the error of the initial velocity to the rendezvous spacecraft at the point C.

As explained above, the rendezvous spacecraft can be restored to the reference trajectory by performing additional two maneuvers after 0.2 around and 0.4 around for any maneuver error.

Figure 3A:
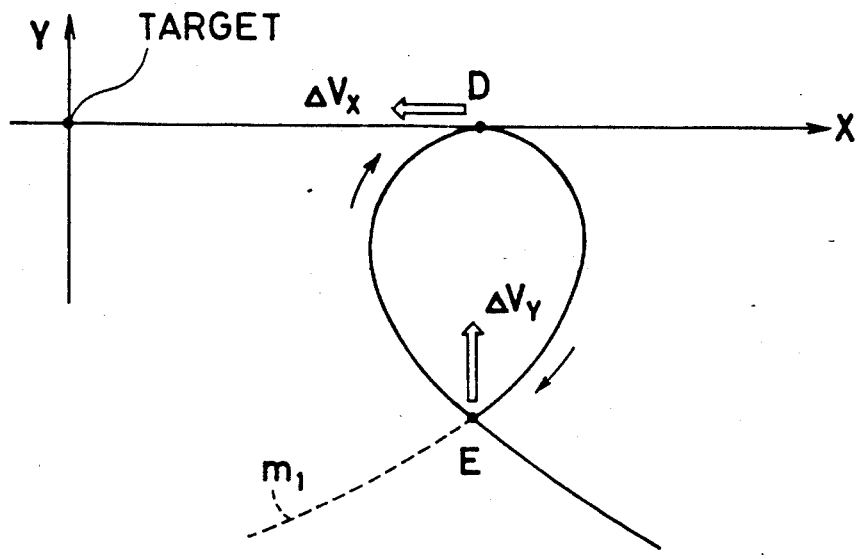
FIGS. 3A to 3C are explanatory views showing outlines of the practical retry/recovery method embodying the present invention.

Next, outlines of the retry/recovery method according to an embodiment in which the present invention is applied to a practical rendezvous maneuver will be described. FIG. 3A is a view showing a retry to be performed in case a failure in relative stationary standing. Thus, if the rendezvous spacecraft has failed to stop at a relative station keeping point D and no retry is performed, the rendezvous spacecraft would travel along a trajectory $m_1$ indicated by a dot line. In this case, the retry is performed as follows. First, at a position E after 0.2 around from the time when the relative stationary standing has failed at the relative station keeping point D, the rendezvous spacecraft is maneuvered by $\Delta V_Y$ in the direction of altitude. Then, at the time when the rendezvous spacecraft reaches the relative station keeping point D after another 0.2 around, a maneuver of velocity $\Delta V_X$ is applied thereto. As a result, the rendezvous spacecraft can be stopped at the relative station keeping point D.

Figure 3B:
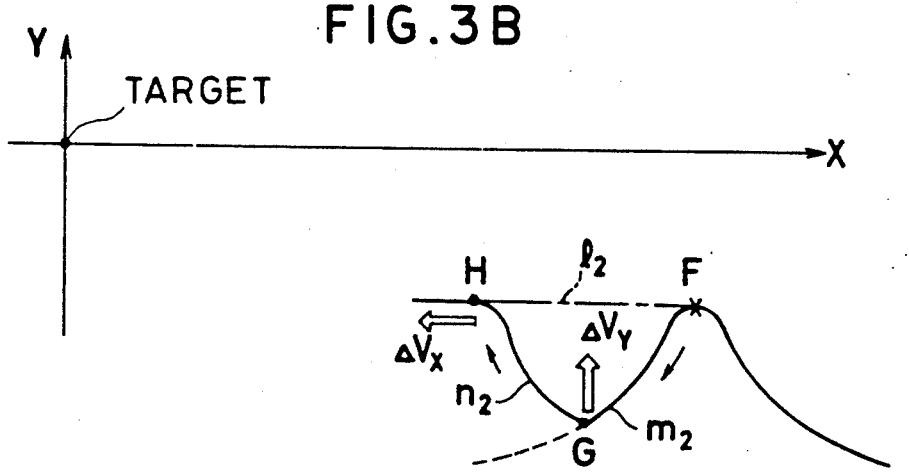

FIG. 3B is a view showing a retry to be performed in case of a failure in transition to a circular reference trajectory. If the rendezvous spacecraft has failed in transition to a reference trajectory $l_2$ at a position F and shifts to a failed trajectory $m_2$, the rendezvous spacecraft is first maneuvered by $\Delta V_Y$ in the direction of altitude at a position G after 0.2 around, thereby shifting it from the failed trajectory $m_2$ to a recovery trajectory $n_2$. Then, at the time when the rendezvous spacecraft reaches a position H on the reference trajectory $l_2$ after another 0.2 around, a maneuver of velocity $\Delta V_X$ is applied thereto. As a result, the rendezvous spacecraft can be shifted in its travel trajectory to a circular reference trajectory $l_2$.

Figure 3C:
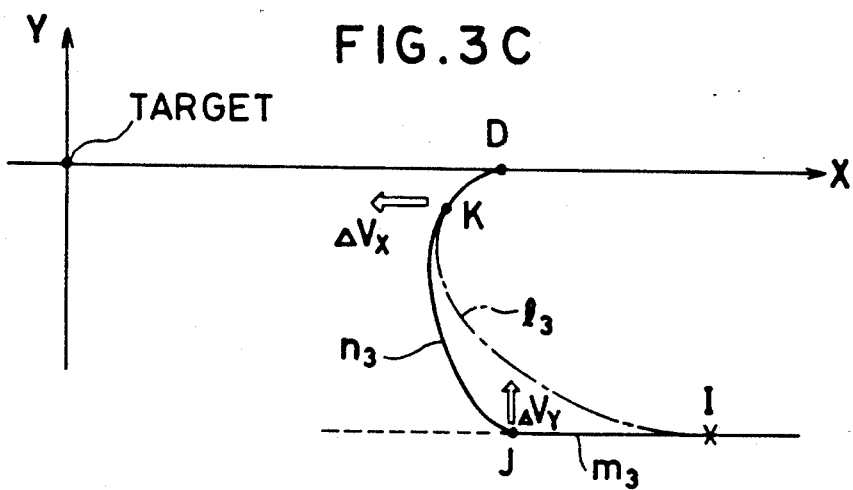

FIG. 3C is a view showing a retry to be performed in case of a failure in injection maneuver to the relative station keeping point. If the rendezvous spacecraft has failed in a maneuver for transition to a reference trajectory $l_3$ at a position I along its travel course and shifts to a failed trajectory $m_3$, the rendezvous spacecraft is first maneuvered by $\Delta V_Y$ in the direction of altitude at a position J after 0.2 around, thereby shifting it from the failed trajectory $m_3$ to a retry trajectory $n_3$. Then, at the time when the rendezvous spacecraft reaches a position K on the reference trajectory $l_3$ after another 0.2 around, a maneuver of velocity $\Delta V_X$ is applied thereto. As a result, the rendezvous spacecraft can be stationary at the relative station keeping point D.

With the retry/recovery method in the rendezvous maneuver according to the present invention, as will be apparent from the above, since the rendezvous spacecraft can be restored to the reference trajectory exactly in the same flight time as when the normal maneuver would have been followed, there is no need of rescheduling a rendezvous sequence in consideration of such conditions as viewability from ground stations and sunshine. Thus, the present method is a technique with excellent operability.

Since the control direction of the retry/recovery maneuver is limited to only the x- and y-directions and a usual spacecraft has thrusters acting in the x- and y-directions, the retry/recovery maneuver can be implemented without need of attitude change.

Further, since the control points in time (after 0.2 around and after 0.4 around), the control direction, and the control amounts ($\Delta V_Y = 4\sin\omega t \cdot \Delta x_0$, $\Delta V_X = -\Delta x_0$) of the retry/recovery maneuver can be simply set, an automatic restoration is enabled in those spacecrafts which have guidance and control system with perfect redundancy.

While the above embodiments have been explained in connection with the rendezvous maneuver in which the rendezvous spacecraft approaches the target spacecraft through the reference trajectory for an approach which is lower in altitude than that of the target spacecraft, the present invention is similarly also applicable to the case where the rendezvous spacecraft approaches the target spacecraft through the reference trajectory for an approach which is higher in altitude than that of the target spacecraft.

As described above, according to the present invention, by applying two additional maneuvers to control the direction of altitude after 0.2 around and then make control the direction of phase after another 0.2 around, the rendezvous spacecraft is always restored to the reference trajectory with no fear of entering a collision course, so that retry/recovery operation may be performed promptly and safely with high reliability. Also, since control amounts in the retry/recovery maneuver can be simply set, it is possible for a spacecraft having a guidance and control system with perfect redundancy to easily realize an automatic restoration.

What is claimed is:

1. In a rendezvous maneuver for approaching a rendezvous spacecraft to a target spacecraft through a reference trajectory for approach which is different in altitude and period from a trajectory of said target spacecraft, and wherein said rendezvous spacecraft deviates from the reference trajectory for approach as a result of a maneuver failure, the method for restoring said rendezvous spacecraft to the reference trajectory for approach comprises:

maneuvering said rendezvous spacecraft by a change in the velocity in the direction of altitude after 0.2 revolutions of said rendezvous spacecraft; and maneuvering said rendezvous spacecraft by a change in the velocity in the direction of phase after another 0.2 revolutions of said rendezvous spacecraft.

2. A method according to claim 1, wherein the change in the velocity in the direction of altitude is expressed by $\Delta V_Y = 4\sin\omega t \cdot \Delta \dot{x}_0 = 3.827 \Delta \dot{x}_0$ wherein $\omega$ is an angular velocity of the target's orbit, t is time, $\omega t = 0.203 \times 2\pi$, and $\Delta \dot{x}_0$ is an error of the approach velocity, and wherein the change in the velocity in the direction of phase is expressed by $\Delta V_X = -\Delta \dot{x}_0$.

* * * * *